United States Patent [19]

Baker et al.

[11] Patent Number: 4,724,152

[45] Date of Patent: Feb. 9, 1988

[54] LOW FAT CREAM CHEESE PRODUCT AND METHOD FOR MAKING

[75] Inventors: Donald B. Baker, Tulsa; Vanessa Hulett, Jenks, both of Okla.

[73] Assignee: The Pro-Mark Companies, Inc., Tulsa, Okla.

[21] Appl. No.: 25,740

[22] Filed: Mar. 13, 1987

[51] Int. Cl.$^4$ ............................................. A23C 19/20
[52] U.S. Cl. .................... 426/335; 426/326; 426/532; 426/582
[58] Field of Search ............... 426/582, 532, 326, 335, 426/36, 43

[56] References Cited

U.S. PATENT DOCUMENTS

| | | | |
|---|---|---|---|
| 2,160,159 | 5/1939 | Lundstedt et al. | 426/582 |
| 3,929,892 | 12/1975 | Hynes et al. | 426/582 |
| 4,244,983 | 1/1981 | Baker | 426/334 |
| 4,379,175 | 4/1983 | Baker | 426/582 |
| 4,397,878 | 8/1983 | Koide et al. | 426/582 |
| 4,534,982 | 8/1985 | Yoshida et al. | 426/34 |
| 4,597,971 | 7/1986 | Davis | 426/582 |

Primary Examiner—Wilbur Bascomb
Attorney, Agent, or Firm—Sixbey, Friedman & Leedom

[57] ABSTRACT

An imitation cream cheese product suitable for low calorie and low fat diets, having a fat content of about 2 to 9% by weight, preferably 6 to 9% by weight, and a method for making such a product having the appearance, texture and taste of cream cheese is provided. The low fat cream cheese type product is prepared by admixing milk, a milk fat-containing carrier, and nonfat dry milk solids to form a dressing mixture; pasteurizing and homogenizing the dressing mixture; heating and agitating the mixture at about 145° to 195° F., preferably about 165° to 190° F.; adding a stabilizer; admixing the stabilizer-containing dressing mixture with cottage cheese curd to form a curd mixture while maintaining the curd mixture temperature in the range from 150° to 175° F., preferably 160° to 175° F.; and homogenizing the curd mixture. Preservatives and flavorings may be added prior to final homogenization to customize the taste and shelf stability characteristics of the cream cheese type product. The cream cheese product is hot packaged in suitable containers at temperatures above 140° F. The resulting product will generally have a shelf life of at least about 90 days with conventional refrigeration.

22 Claims, No Drawings

LOW FAT CREAM CHEESE PRODUCT AND METHOD FOR MAKING

BACKGROUND OF THE INVENTION

1. Field of the Invention

The present invention relates generally to a method for making a cream cheese type product having the appearance, taste, consistency and texture of cream cheese and, more specifically, to a method for making an imitation cream cheese product having a fat content significantly below that of conventional cream cheese and of heretofore known imitation cream cheeses.

2. Description of the Prior Act

In recent years, for health as well as cosmetic reasons, there has developed an increasing concern with diet which has focused on diets that reduce calorie and fat consumption. Low calorie foods which look and take like their higher calorie counterparts have been eagerly sought by the public. To this end food researchers have concentrated on developing food products which are nutritious and palatable, but which contain substantially reduced levels of high calorie and/or fatty components. This is particularly true in the dairy industry where such low calorie, low fat products as skim milk, yogurt, and the like have been successfully marketed. However, the high fat levels in some dairy products, such as cream cheese (fat content of at least about 33%), have heretofore been thought to be necessary to maintain a desirable creamy mouth feel and to avoid the powdery, grainy mouth feel associated with prior low fat forms of cream cheese. As a result, those choosing to reduce their caloric or fat intake have usually omitted high fat dairy products, such as cream cheese, from their diets.

At least partially in response to the desire of the dieting public to continue to partake of these heretofore high fat dairy products, efforts have been made to develop imitation cream cheeses which substitute vegetable fats for the animal fats normally found in dairy products. See, e.g., U.S. Pat. No. 4,534,982 to Yoshida et al disclosing a fermentation process for preparing a 31 to 35% vegetable fat or oil-containing imitation cream cheese product. In addition, efforts have been made to develop imitation cream cheese products which contain reduced fat contents. Exemplary efforts in this regard are disclosed in U.S. Pat. Nos. 2,160,159 to Lundstedt et al and 3,929,892 to Hynes et al. However, the fat content of the cheese products produced by the methods of these patents still exceed about 10% fat, a content which is unacceptably high from the standpoint of those desiring or required to reduce their calorie or fat intake.

Moreover, some of these prior art methods require involved processing steps and/or impose ingredient standards which are unrealistically difficult or expensive to meet. For example, Hynes et al describe a process for making an imitation cream cheese which involves difficult and/or expensive procedures such as successive heating steps, denaturation of serum proteins in the presence of casein to achieve the desired features of the therein described invention, and close ingredient control to achieve a prescribed level of lactose in the final product.

More recently, methods have been developed for making very low butterfat content imitation cream cheese products having very low calorie contents which are intended for the diet coscious consumers. In U.S. Pat. Nos. 4,244,983 to Baker and 4,379,175 to Baker there are disclosed imitation cream cheese products, and methods for their manufacture, having butterfat content of less than about 5%, preferably less than about 2%, and which contribute only about 60 calories per serving to the diet. The very low butterfat content of these products, although extremely attractive to diet conscious consumers, make it very difficult to closely duplicate the creamy and full-bodied consistency of full fat cream cheese. Moreover, the disclosed methods for making these very low butterfat content imitation cream cheese products are not as efficient and economical as had been anticipated.

SUMMARY OF THE INVENTION

It is, therefore, a primary object of the present invention to provide a cream cheese type dairy product which even more closely resembles covnentional cream cheese in appearance, texture and taste than prior low butterfat imitation cream cheese products, but which still has a fat content substantially below that of conventional and existing imitation cream cheese products.

It is another object of the present invention to provide a nutritious, palatable imitation cream cheese product which has a creamy mouth feel similar to conventional cream cheese yet which has a fat content substantially below 10% by weight.

It is yet another object of the present invention to provide a cream cheese type product which is very low in butterfat content and contributes relatively few calories to the diet, making it a particularly attractive product for diet conscious consumers.

It is still another object of the present invention to provide an improved method for making a low fat imitation cream cheese product.

Other objects and advantages will become apparent from the following description and appended claims.

In accordance with the aforesaid objectives, the present invention provides a process for making a low calorie, low fat cream cheese type dairy product resembling cream cheese in appearance, texture and taste which includes the steps of admixing milk, a fat-containing carrier and nonfat dry milk solids to form a dressing mixture; pasteurizing and homogenizing the mixture; heating the mixture to a temperature in the range from about 145° to 195° F., preferably 165° to 190° F., with constant agitation; admixing a stabilizer into the mixture; adding, while maintaining the temperature of the mixture in the range of 150° to 175° F., preferably 160° to 175° F., soft, unripened cultured cheese curd, e.g., cottage or bakers cheese curd, to the stabilizer-containing dressing mix; and pumping the resulting substantially uniform mixture to a homogenizer where it is homogenized under conventional, elevated pressure conditions of 500 to 5000 psig, preferably 1500 to 3000 psig. Following homogenization, the imitation cream cheese product, at temperatures of at least 140° F., is packaged in convenient shapes in a well known manner. Other conventional ingredients intended to increase the cream cheese product's shelf life, improve its taste and/or adjust its texture may be added at any time prior to final homogenization. However, care must be taken, particularly with temperature sensitive additives such as some flavorings, to add them only after high temperature processing is completed and the mixture reaches a suitable, e.g., 140°–160° F., temperature range.

The imitation cream cheese type product of the present invention comprises a major amount of pasteurized, homogenized milk products and minor amounts of flavorants and stabilizers. Most importantly, the product of the present invention has a total butterfat content by weight of 2-9% butterfat, preferably 6-9% butterfat and contributes only about 35 calories per serving (about 35 calories per ounce) to the diet. It is a smooth palatable product very closely resembling cream cheese in appearance, texture and taste. Desirably, the product has a pH in the range 4.5 to 5.5, preferably 4.5 to 4.8, a total solids content of about 21-28%, preferably 24-26%, and a fat content of 6.5 to 8.5%.

DETAILED DESCRIPTION OF THE INVENTION

The present invention relates broadly to a soft, imitation cream cheese type dairy product which resembles cream cheese in appearance, texture and taste, but which has a fat content which is substantially reduced below the fat content of conventional cream cheese. As a result, the imitation cream cheese made by the method of the present invention is a desirable component of the diet of persons desiring to decrease their caloric intake and to reduce the fat content of their diet.

The process by which the unique imitation cream cheese type product of the present invention is made involves forming a dressing mixture by blending milk, a fat-containing carrier, nonfat dry milk solids and non-temperature sensitive flavorings, pasteurizing the dressing mixture, e.g., by the HTST method, and homogenizing the mixture, desirably in a single stage homogenizer at pressures in the range 500 to 5000 psig. It is important in the practice of the present process that at this early stage of processing no stabilizer addition has yet been made. This is because, in practical operation, the dressing mixture is typically blended in a mixing vat, pumped to and through an HTST pasteurizer and then pumped through a homogenizer. Frequently in diary operations, following homogenization, it is desirable for logistical and other reasons to interrupt the processing and to temporarily hold the dressing mixture for a brief period (less than 24 hours) before resuming. This requires pumping the dressing mixture from the homogenizer directly to a holding vat wherein it is cooled, e.g, to 34°-36° F., until processing is resumed. It will be appreciated that the addition of even conventional levels of a stabilizer to the dressing mixture would make it very difficult to pump the mixture to and from the various vats and through the pasteurizer and homogenizer. The temperature of the mixture would have to be held in a temperature range high enough, e.g., 145° to 160° F., that the stabilizer cooling the dressing mix, as a practical matter, would not be possible. At the somewhat higher stabilizer levels contemplated in accordance with the present invention, these problems would be exacerbated.

When processing is resumed (assuming it had been interrupted) or continued, the dressing mix is heated to a temperature in the range 145° to 195° F., preferably 165° to 190° F, with continuous blending. A stabilizer is added and blending is continued to thoroughly incorporate the stabilizer into the dressing mixture. Desirably, the temperature is maintained high enough for long enough, e.g., 175° F. for 30 minutes, to destroy any bacteria and the like added in the stabilizer. Cottage cheese curd is slowly added and blended into the stabilizer-containing dressing mixture while maintaining the resulting temperature in the range of about 150° to 175° F., preferably 160° to 175° F. At this point the temperature of the curd containing mixture is adjusted, as necessary, to allow addition if desired, of any temperature sensitive additives, such a volatile flavorants and bacterial cultures. The final mix is substantially uniform and readily pumpable to a homogenizer for high pressure homogenization. This latter procedure may be controlled, as is well known in the art, to adjust the firmness of the cheese product which results. Finally, the cream cheese product is packaged, desirably by hot packaging at temperatures above about 140° F., to improve its keeping qualities.

In order to prepare an imitation cream cheese product having a fat content in the range 2 to 9% by weight, the fat contributing ingredients, primarily the milk and the fat-containing carrier, must be selected and carefully proportioned. In so doing it should be borne in mind that many dairy flavorants which might subsequently be used can contribute to the fat content of the final cream cheese product. However, inasmuch as flavorants are generally employed in very small quantities, particularly as compared with the milk and fat-containing carrier ingredients, their contribution to the final fat content will not be significant.

The term "milk" as used herein means the conventional milk of commerce which may have a butterfat content ranging from as low as 0.01% up to 3.5%. Within this range are conventional skim milk (less than about 0.4% by weight butterfat) and conventional full fat milk (up to about 3.5% by weight butterfat). The term "fat-containing carrier" as used herein means a milk or vegetable fat containing carrier which is suitable for admixture with milk to adjust the fat content thereof. Such fat-containing carriers may comprise or contain vegetable fats such as coconut oil, soybean oil, peanut oil, safflower oil, and the like. Most preferred, however, are milk fat carriers such as the conventional dairy cream of commerce which may have a butterfat content of 30% or higher. The term "milk" also contemplates equivalent compositions formed by suitable admixtures of milk solids and water.

It will be appreciated that various proportioned mixtures of milk and fat-containing carrier can achieve a desired fat content within the desired range of 2 to 9% fat by weight. However, it should also be recognized that it is important to develop a suitable fluidity in the mixture for ease of processing and, ultimately, to develop the desired texture in the cream cheese type product. Therefore, the selection of milk and fat containing carrier proportions should take into account the importance of maintaining a convenient moisture content in the mixture during processing as well as the need for achieving a particular fat content. In so doing it is important to appreciate that the major ingredient of the cream cheese type product is dry cultured cottage cheese curd. Dry cultured cottage cheese curd is a well known dairy product which is a drained, uncreamd cheese curd made by inoculating skim milk with culture and allowng the product to coagulate. Curd made by the direct acidification method have not been found to be suitable in the present process. Generally, dry cultured cottage cheese curd comprises about 20 to 25% by weight nonfat milk solids and 75 to 80% by weight water. When used herein, the term "dry cultured cottage cheese curd" refers to a soft ripened cheese curd such as a cottage cheese or bakers cheese curd product having these characteristics.

To prepare the imitation cream cheese product of the present invention, the selected milk and fat-containing carrier components are admixed with nonfat dry milk solids to form a dressing mix, usually in a stainless steel vat or like mixing container and blended using a paddle mixer and/or recirculatory pumps for a time sufficient to achieve complete blending of the ingredients. The nonfat dry milk solids are well known, readily available dairy products which aid in significantly increasing the solids content of the imitation cream cheese product of the present invention in order to more closely resemble the texture, consistency and mouth feel of conventional full fat cream cheese. Desirably the nonfat milk solids are produced by spray-drying at a temperature as low as possible. At the same time, if desired, non-temperature sensitive additives such as preservatives, edible acids and some flavorants may be blended into the dressing mix. The mix is pasteurizer by pumping through a conventional HTST pasteurizer under appropriate time and temperature conditions, such as about 168° F. for about 16 seconds or at such higher temperatures and longer or shorter times as may be needed. If HTST equipment is not available, vat pasteurization at 190° F. for thirty minutes, or its equivalent, with care to avoid scorching, may be substituted. The mixture is also homogenized to avoid separation of the cream. This may be accomplished in a conventional, well known manner by pumping the conveniently fluid dressing mixture to a conventional homogenizer unit for homogenization at pressure in the general range of 500 to 5000 psig. Desirably, the homogenization occurs in a single stage homogenizer at pressures in the range 1500 to 3000 psig.

At this stage of the processing the pasteurized and homogenized dressing mix may be pumped to a holding tank, if desired. In such a case the dressing mix is desirably cooled to about 34° to 36° F. until processing is continued, but not for more than 24 hours. This is to avoid spoilage of the milk products. When processing is resumed, if it was interrupted, or continued, whichever is the case, the dressing mix is heated in a tank, with continuous blending, to a temperature in the range 145° to 195° F., preferably 165° to 190° F., to completely blend the ingredients and to form a uniform, substantially homogeneous mixture. The preferred milk is skim milk having a butterfat content of 0.5% or less. The preferred fat-containing carrier is cream which contains about 40% butterfat. The heating time and the temperature to which the mixture is heated generally have an inverse relationship with increased temperatures requiring decreased heating times. Experience has indicated that heating at about 175°F. for thirty minutes is sufficient to achieve the desired purpose. Heating is typically indirect and is accomplished by passing pressurized steam through conduits which jacket or are disposed within the mixing vat. Therefore, relatively close temperature control can be maintained by controlling steam flow through the conduits. Mixing of the ingredients may be accomplished in any desired fashion, e.g., by paddle blender agitation, use of recirculating pumps, or both.

To the heated and agitated mixture of milk, fat-containing carrier and nonfat milk solids, a stabilizer is added and thoroughly admixed to disperse the stabilizer therein in order that it may effectively bind the water in the dressing mix and improve the body, consistency and mouth feel of the final product. Desirably, the stabilizer is added in amounts of from 0.5 to 1.5% by weight of the total ingredient mix. In addition to the economic advantages, hereinbefore described, of adding the stabilizer as late in the processing as possible, it has been found that addition of the stabilizer at this point has the additional and suprising advantages that less stabilizer is required than if earlier added, in part because none is lost during prior heating steps, and the final cream cheese product is more stable and exhibits an improved shelf life. The stabilizer or combination of stabilizers employed may be selected from any of a number of commercially available dairy product stabilizer bases. Typically useful stabilizers contain hydrocolloids such as fruit pectin, pectic acid, gelatin, alginic acid (as well as suitable sodium and calcium compounds), tetrasodium pyrophosphate, agar-agar, carageenan, guar meal or flour, carob-bean meal or flour, enriched starches, modified food storage starch meal or powder. During and following stabilizer addition, the stabilizer-containing dressing mix is maintained within the desired 145° to 195° F. temperature range, e.g., 175° F. for thirty minutes, to assure that any bacteria carried into the mixture with the stabilizer are killed.

To the heated and agitated stabilizer-containing dressing mixture dry cultured cottage cheese curd is added in sufficient quantity that the curd comprises from 45 to 60%, preferably 54 to 56%, by weight of the total ingredient mix. Agitation of the mixture is continuous, for example by using a centrifugal pump to recirculate the dressing and the curd, to allow the curd to become substantially completely coated and intermingled with the stabilizer-containing dressing mixture which serves as a dressing therefor and to maintain the temperature throughout as uniform as possible. Since the cottage cheese curd was likely to have been refrigerated at about 40° F. prior to use, the addition of the curd will cause the overall temperature of the mixture to decrease substantially. Therefore, close temperature monitoring and control should be practiced to maintain the mixture at a temperature not less than about 150° to 175° F., preferably 160° to 175° F. If the temperature drops too low the stabilizer will begin to set with the result that the uniformity and fluidity of the mixture will be diminished. At temperatures above about 175° F. there is the substantial risk of scorching the mixture onto the sides of the tank.

Dry cultured cottage cheese curd, notwithstanding its high moisture content, is a substantially dry to highly viscous curd mass which, following coating with the dressing mixture, forms a very highly viscous creamy mass. This creamy mass can be agitated, for example with mechanical agitators at slow speeds, to distribute the fluid dressing mixture over the curds. However, a substantially solid additive, such as a stabilizer, could not be effectively dispersed throughout the dressed curd. Inasmuch as thorough dispersion and intimate admixture of the stabilizer with the dressed curd is essential in order to derive the optimum water binding and consistency enhancing benefits from use of a stabilizer, it is necessary, in accordance with the present invention, to add the stabilizer to the dressing mixture as late in the processing as possible but prior to curd addition. By the same token it is necessary to hold off curd addition until after the stabilizer has been thoroughly admixed with and dispersed throughout the dressing mixture.

Preservatives and flavorants may be added at any point in the process, e.g., to the dressing mixture prior to curd addition or to the dressed curds, or to both, depending upon the temperature sensitivity of the additives and the convenience of addition. Thus, it is desirable to add flavorants and preservatives which will not be volatilized or rendered ineffective by high temperatures directly to the dressing mixture since the heat, together with the continuous agitation, facilitates their dissolution in the mixture. On the other hand, temperature sensitive additives should not be added until high temperature processing is complete and the temperature has been adjusted, as necessary, below the critical temperature for the particular additive.

Any conventional, food grade, FDA approved preservative may be employed to inhibit mold formation and other deterioration and to increase shelf life. Typical of the desirable preservatives is potassium sorbate, a well known bacteriostat, anti-oxidant and mold inhibitor, although other suitable preservatives, e.g., benzoate of soda, may be used. Typically, preservatives are employed in only trace quantities, e.g., about 0.1%.

Likewise, any food grade, FDA approved flavorant may be used to adjust the taste of the imitation cream cheese product. Inasmuch as flavoring is a very subjective area, and since tastes differ so widely, each producer of imitation cream cheese will likely select the flavorant or combination of flavorants which it believes most closely approximate the taste of conventional cream cheese. Thus, there are no flavorants whose use is indispensible to producing an acceptable product. It is worthy of note, however, that experience has suggested the use of salt (sodium chloride) and an edible acid to assist in adjusting the flavor of the cream cheese product. The edible, food grade, FDA approved acid may be any one of the many which are available, e.g., lactic acid or citric acid. Exemplary of other flavorants which may be desirable for use are concentrated cultured dairy flavorings, e.g., a buttermilk flavoring available from Haarmann & Reimer Corp., of Springfield, New Jersey under the trade designation "Vitex". Typically, flavorants are employed in quantities ranging from trace amounts up to about 3% by weight. Where temperature sensitive flavorants are to be employed, they should not be added until the temperature of the stabilizer-containing dressed cottage cheese curd has been reduced to at least the 140° to 160° F. range. Illustrative of flavorants which fall into this category are buttermilk flavor (a nonfat artificial flavor) and bacterial cultures. The latter generally require about 24–48 hours to become active and contribute to flavor. Exemplary of useful commercially available cultures are those containing streptococcus diacetilactus or other lactic acid-producing bacterial cultures. If such cultures are used, then the preservative may not be added until culturing is complete.

After all desired ingredients have been thoroughly admixed, which generally requires about fifteen minutes of blending, and with temperature typically maintained in the range from about 140° F. to 160° F., a substantially uniform and fluid mixture is formed which can be directed, preferably by pumping, to a conventional homogenizer unit. In the unit the mixture is homogenized at pressures in the general range of 500 to 5000 psig. It has been found that a desirably firm imitation cream cheese product will result from a homogenization pressure in the range 1500 to 3000 psig. The resulting product has a smooth, creamy appearance and a texture and taste very closely approximating that of conventional cream cheese.

The homogenized product is pumped hot, at at least 140° F., via a filler machine into packages in conventional manner for hot packing cream cheese and like products, and is then cooled immediately to refrigeration temperatures, about 35° to 45° F., preferably about 40° to 42° F. The hot-packed product is normally devoid of coliform bacteria, yeast and molds and has better keeping qualities. When the product is stored at standard refrigeration temperatures it has a usual shelf life of not less than about 90 days.

The following example illustrates the practice of the present invention and is intended to exemplify and not to limit in any respect the content and scope thereof.

EXAMPLE

The following ingredients were mixed in the amounts indicated in a stainless steel, steam jacketed, cone-shaped mixing vat equipped with an agitator:
Skim milk (less than 0.1% butterfat): 815.0 lbs.
Cream (40% butterfat): 765.0 lbs.
Nonfat dry milk solids: 66.0 lbs.
Potassium sorbatic: 3.4 lbs.
Citric acid: 3.0 lbs.

Blending of the ingredients was carried out using paddle blenders and a recirculating pump and was continued until a uniform, substantially homogeneous dressing mixture was obtained. The mixture was pumped to an HTST pasteurizer where it was pasteurized at 168° F. for 16 seconds. Following pasteurization the mixture was pumped to a single stage homogenizer where it was homogenized at about 2500 psig and then pumped back to the vat where the mixture was heated slowly by pressurized steam in the vat jacket. When the temperature reached about 165°-170° F., a mixture of 29.0 lbs. of cream cheese stabilizer and 24.0 lbs of salt was added slowly while agitation was continued to thoroughly incorporate the stabilizer/salt addition into the dressing mixture. Heating was continued until the mixture in the vat reached 175° F. at which point it was continued at constant temperature for about 30 minutes. 2,091 pounds of refrigerated (40° F.) cultured cottage cheese curd were then stirred into the already admixed ingredients. Steam flow through the jackets was resumed to maintain the temperature at about 160° to 175° F. Agiation was continued to permit the cottage cheese curd to become intimately intermingled with and coated by the stabilizer-dressing mixture. 30 lbs. of "Vitex" brand of conventional buttermilk flavor were mixed into the curd-containing mixture and blending was continued for a time sufficient to assure formation of a uniform, fluid, readily pumpable mix. The resulting mixture was pumped to a homogenizer where it was homogenized at about 2500 psig before being packaged at about 145° F., cooled to 42°-44° F., and then refrigerated. The final product resembled cream cheese in color, appearance, texture and taste, contained about 8% fat, about 25% solids and had a pH of about 4.6. The imitation cream cheese product contained about 35 calories per ounce.

While the present invention has been described with reference to specific embodiments thereof, it will be understood that numerous modifications may be made by those skilled in the art without actually departing from the scope of the claimed invention. Accordingly, all modifications and equivalents may be resorted to which fall within the scope of the invention as claimed.

We claim:
1. A method for making a low fat cheese product which resembles cream cheese in appearance, texture and taste, comprising the steps of:
 (a) admixing milk, a milk fat-containing carrier having a butterfat content of at least 30% by weight and nonfat dry milk solids to form a dressing mixture, the relative proportions of milk and milk fat- containing carrier being selected to provide a fat content in the cheese product from about 2 to 9% by weight;
(b) pasteurizing said dressing mixture;
(c) homogenizing said dressing mixture at pressures in the range 500 to 5000 psig;
(d) heating said pasteurized and homogenized dressing mixture to a temperature in the range from about 145° to 195° F. with constant agitation for a time sufficient to achieve complete blending of the ingredients to form a uniform, substantially homogeneous mixture;
(e) admixing a stabilizer and said heated and agitated dressing mixture;
(f) admixing dry cottage cheese curd and said stabilizer-containing dressing mixture to coat said curd therewith and to form a substantially uniform curd mixture, said curd comprising from 45 to 60% by weight of said cured mixture and any flavorants added thereto, while maintaining said curd mixture at a temperature in the range from about 150° to 175° F.;
(g) adding flavorants prior to step (h); and
(h) homogenizing said flavorant-containing curd mixture at pressures in the range 500 to 5000 psig.

2. A method, as claimed in claim 1, wherein said milk is skim milk.

3. A method, as claimed in claim 2, wherein said milk fat-containing carrier is diary cream having a butterfat content of about 40%.

4. A method, as claimed in claim 1, wherein a preservative is added at any time prior to step (h).

5. A method, as claimed in claim 1, wherein said pasteurizing is accomplished by BTST techniques.

6. A method, as claimed in claim 5, wherein said pasteurizing is accomplished by heating said dressing mixture at about 168° F. for about 16 seconds.

7. A method, as claimed in claim 1, wherein said homogenizing pressure for homogenizing said dressing mixture is in the range of 1500 to 3000 psig.

8. A method, as claimed in claim 1, wherein said homogenizing pressure for homogenizing said flavorant-containing curd mixture is in the range 1500 to 3000 psig.

9. A method, as claimed in claim 1, including the additional step of packaging said low fat cheese product at temperatures above 140° F. and cooling said packaged product to refrigeration temperatures.

10. A method, as claimed in claim 1, wherein said flavorant addition comprises adding salt and an edible acid.

11. A method, as claimed in claim 10, wherein said edible acid is citric acid.

12. A method, as claimed in claim 1, wherein said flavorant addition comprises adding buttermilk flavoring.

13. A method, as claimed in claim 12, wherein said flavorant addition further comprises adding salt and an edible acid.

14. A method, as claimed in claim 13, wherein said edible acid is citric acid.

15. A method, as claimed in claim 1, wherein said dressing mixture is heated to a temperature in the range from about 165° to 190° F.

16. A method, as claimed in claim 1, wherein said curd mixture is maintained at a temperature in the range from about 160° to 175° F.

17. A method, as claimed in claim 1, wherein said dressing mixture is heated to about 175° F. for about 30 minutes following stabilizer addition.

18. A method, as claimed in claim 1, wherein said proportions of milk and milk fat-containing carrier are selected to provide a fat content in the cheese product from about 6 to 9% by weight.

19. A method, as claimed in claim 1, wherein said curd comprises from 54 to 56% by weight of said curd mixture and any flavorants added thereto.

20. A method, as claimed in claim 2, wherein said proportions of milk and milk fat-containing carrier are selected to provide a fat content in the cheese product from about 6 to 9% by weight; said pasteurizing is accomplished by BTST techniques; said curd mixture is maintained at a temperature in the range from about 160° to 175° F.; and, a preservative and flavorants comprising salt, an edible acid and buttermilk flavoring are added prior to step (h).

21. The low fat cheese product produced by the method of claim 1.

22. The low fat cheese product produced by the method of claim 20.

* * * * *